April 15, 1924.
R. TATTU
1,490,545
RAIL FASTENING FOR BEDSTEAD CORNERS AND THE LIKE
Filed Aug. 24, 1922
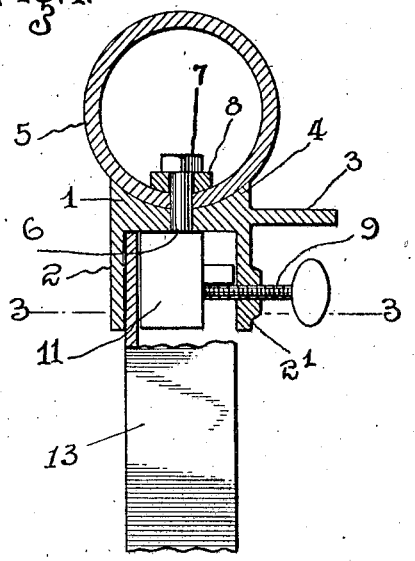
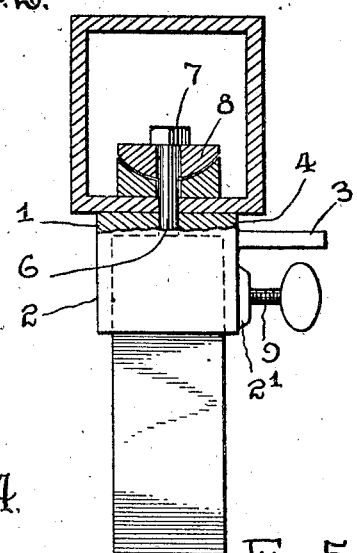
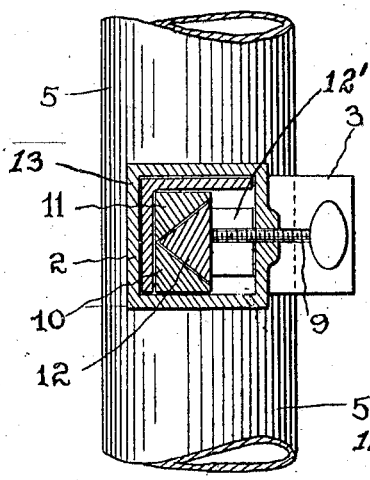
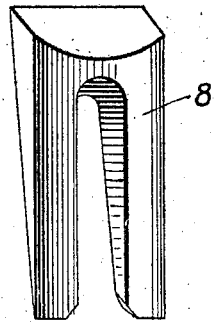
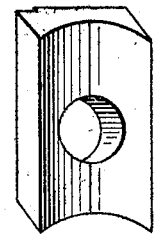
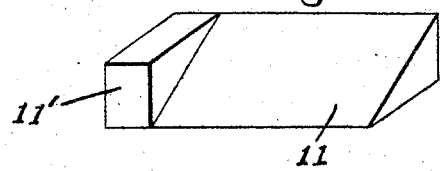
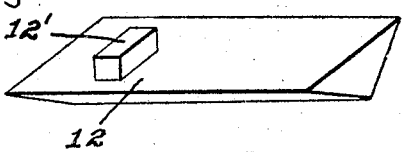
Inventor
Radu Tattu
By his Attorney Patented Apr. 15, 1924.

1,490,545

UNITED STATES PATENT OFFICE.

RADU TATTU, OF BROOKLYN, NEW YORK.

RAIL FASTENING FOR BEDSTEAD CORNERS AND THE LIKE.

Application filed August 24, 1922. Serial No. 583,949.

*To all whom it may concern:*

Be it known that I, RADU TATTU, a citizen of the United States, and a resident of the borough of Brooklyn, city of New York, in the county of Kings and State of New York, have invented certain new and useful Improvements in Rail Fastenings for Bedstead Corners and the like, of which the following is a specification.

My invention relates to improvements in rail fastenings for bedstead corners and the like, and the object of my invention is to provide a firm, secure and rigid joint which may be easily knocked down and assembled. I accomplish this object by the device illustrated in the accompanying drawings in which—

Fig. 1 is a horizontal section of my improved device applied to a cylindrical post;

Fig. 2 is an optional form of the device applied to a square post;

Fig. 3 is a section on the line 3—3 in Fig. 1;

Fig. 4 is a view of the upper wedge block;

Fig. 5 is a view of the pillow block used in connection with a square post;

Figs. 6 and 7 are views of the wedge blocks.

Similar characters of reference refer to similar parts throughout the several views.

My improved device includes a socket member 1 preferably provided with a horizontal rectangular socket or box 2, a projecting lug or bracket 3 and a face 4 shaped to conform to the bed-post 5.

A retaining bolt 6 may be seated in the face of the socket member 1 and projects into the post 5 and is provided with an enlarged head 7. A bifurcated wedge 8 is provided which may be inserted under the head 7 of the bolt 6 to securely hold the same in position.

In a side face 2' of the box 2 I provide a threaded aperture for a set screw 9 which projects into the box 2.

Within the box 2 I provide three wedge members 10, 11 and 12 and so positioned that pressure upon the spreader member 12 will drive it down between the wedge members 10 and 11 forcing them down and also spreading them apart and toward the adjacent walls of the containing box or socket 2. On the outer face of the spreader member 12 I provide a lug 12' which lies back of the inserted set screw 9 whereby the spreader member 12 is retained within the box 2. On the adjacent side faces of the wedge members 10 and 11 I provide lugs, the lug 11' on the wedge 11 being alone shown and the wedge 10 and its corresponding lug being a counterpart of the wedge 11 illustrated. These lugs are positioned rearwardly of the spreader member 12 whereby the wedge members 10 and 11 are held within the box 2.

As illustrated in the drawing the vertical web of the angle iron side rail is on the outer side and the horizontal web is on the top. I find it desirable, where slats are used in the bedstead, to place the horizontal web on the bottom to form a support for the slats. My device will readily lend itself to this arrangement and the side rail may be used in my device with the horizontal web at either the top or bottom as desired and it will be held with like rigidity in either position.

The device being thus assembled, an angle iron 13 forming the side rail of the bedstead may be inserted in the box 2 and under the wedges 10 and 11. The set screw 9 is then forced into the box 2 and against the spreader 12 thereby driving the wedges 10 and 11 against the adjacent webs or leaves of the angle iron side rail 13 which are respectively pressed downward and outward against the sides of the box 2 whereby the angle iron 13 is frictionally engaged and securely held within the box 2. The wedges 10 and 11 are preferably counterparts and are interchangeable. As will be apparent, the angle iron side rail 13 is pinched and frictionally engaged on both webs, thus affording a peculiarly firm and rigid joint. The end rails of the bedstead which are not shown on the drawings may be mounted upon the bracket 3 in any desired manner. The side rail 13 may be readily removed from the box 2 by releasing the pressure of the set screw 9 upon the spreader 12.

Having thus described my invention, what I claim is:

1. In a device of the character described, a rectangular walled socket, a pair of wedge members therein and spaced from the walls of the socket to receive the vertical and horizontal webs of an angle iron side rail, a spreader between the contiguous faces of the wedge members and a set screw seated in the wall of the socket and adapted to press against the spreader whereby the side rail is pressed both vertically and laterally and frictionally engaged between the wedge members and the socket in two directions.

2. In a device of the character described, a rectangular walled socket, a pair of wedge members in the socket and positioned to engage the two webs of an angle iron side rail placed between the walls of the socket and the wedge members, a spreader between the contiguous faces of the wedge members and means for depressing the spreader against the wedge members, whereby the wedge members are pressed out in two directions to frictionally engage both webs of the angle iron side rail to form a rigid joint.

3. In a device of the character described, the combination of a rectangular walled socket, a pair of wedge members in the socket, a spreader between the contiguous faces of the wedge members, lugs carried by the wedge members and adapted to position the wedge members in relation to the spreader, means for depressing the spreader against the wedge members whereby the wedge members will be driven in two directions to engage and pinch two webs of a side rail angle iron against the side walls of the socket.

4. In a device of the character described, the combination of a rectangular walled socket, a pair of wedge members in the socket, a spreader between the contiguous faces of the wedge members, lugs carried by the wedge members and adapted to position the wedge members in relation to the spreader, a set screw in the wall of the socket adapted to bear against the spreader and press the spreader against the wedge members and a lug on the spreader adapted to position the spreader with relation to the set screw.

Signed at New York, in the county of New York and State of New York, this 11 day of August A. D. 1922.

RADU TATTU